Dec. 23, 1930.  M. L. HANCOCK  1,786,299

SLACK ADJUSTER

Filed Aug. 14, 1928

INVENTOR
MILTON L. HANCOCK
BY *Wm. A. Cady*
ATTORNEY

Patented Dec. 23, 1930

1,786,299

UNITED STATES PATENT OFFICE

MILTON L. HANCOCK, OF EAST McKEESPORT, PENNSYLVANIA, ASSIGNOR TO THE WESTINGHOUSE AIR BRAKE COMPANY, OF WILMERDING, PENNSYLVANIA, A CORPORATION OF PENNSYLVANIA

SLACK ADJUSTER

Application filed August 14, 1928. Serial No. 299,550.

This invention relates to fluid pressure brakes, and more particularly to a slack adjuster for automatically taking up slack due to wear of the brake shoes and associated parts, so that the brake cylinder piston travel may be maintained substantially constant.

The principal object of my invention is to provide an improved slack adjuster of the above type which will operate automatically to take up slack due to wear of the brake shoes and associated brake parts and which will prevent an adjustment of the brake parts from being effected when the piston travel exceeds a predetermined limit which may be due to the spring of the brake parts and not to wear.

Another object of my invention is to provide a slack adjuster which will operate to take up slack when the brake cylinder pressure is low and which will not operate when the brake cylinder pressure is high.

Other objects and advantages will appear in the following more detailed description.

Figure 1:
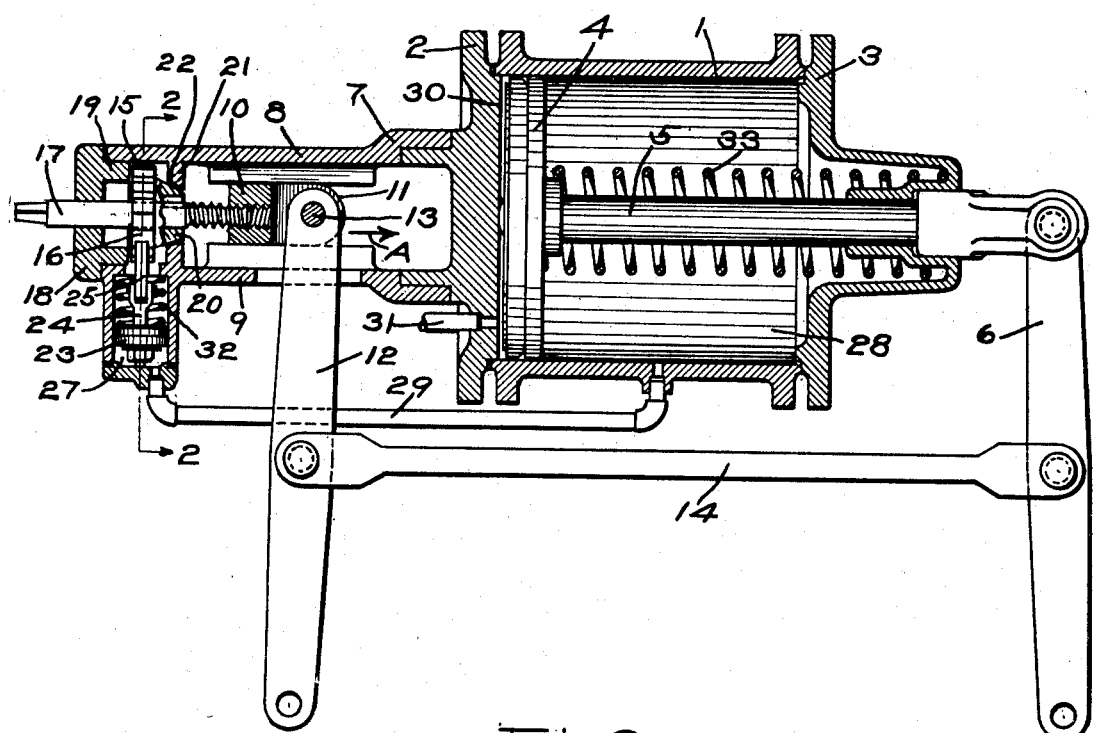
Figure 2:
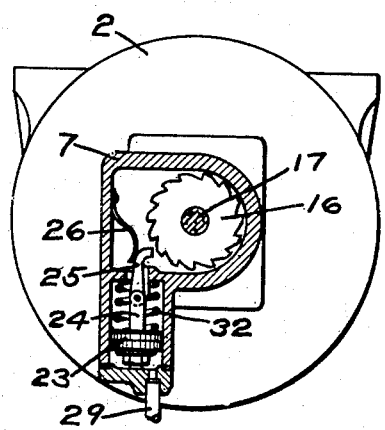

Fig. 1 is a view, mainly in section, of a portion of a vehicle brake embodying my invention; and Fig. 2 is a sectional view taken on the line 2—2 of Fig. 1.

As shown in the accompanying drawing, the slack adjuster may comprise a brake cylinder having a cylinder portion 1, to one end of which is secured a pressure head 2 and to the other end of which is secured a non-pressure head 3.

Contained in the cylinder portion 1 is a piston 4 having a stem 5 which extends through an opening formed in the non-pressure head 3, the outer end of the stem being operatively connected with one end of a lever 6.

Projecting outwardly from the pressure head and rigidly secured thereto is a bracket member 7 having spaced sides 8 and 9 between which a block 10 is slidably mounted. This block has a central opening, the metal defining said opening being provided with screw threads and also has spaced lugs or jaws 11, between which one end of a lever 12 extends, said end being operatively connected to the jaws 11 by a pin 13.

The free ends of the brake levers 6 and 12 are connected in the usual manner with usual truck brake riggings (not shown). Intermediate their ends these levers 6 and 12 are operatively connected together by a rod 14.

Contained in a chamber 15, in the outer end portion of the bracket member 7, is a ratchet wheel 16 which is keyed to a rotatable shaft 17, the outer end portion of which is journalled in a cap plate 18 secured to the bracket member. The inner end portion of the shaft extends into the opening formed in the block 10 and is provided with screw threads which engage with the screw threads provided in the block.

The cap plate 18 is provided with an inwardly projecting annular lug 19 which is adapted to form an end thrust abutment for the ratchet wheel 16.

The ratchet wheel 16 is preferably provided with a cone-shaped projection 20 which extends into an opening in a wall 21 of the bracket member. The surface 22 defining this opening is preferably made to correspond to the outer surface of the projection 20 with which it is adapted to engage.

Between the ratchet wheel 16 and the wall 21 clearance is provided which is sufficient to permit the projection 20 on the ratchet wheel to be moved into close engagement with surface 22 without the toothed portion of the ratchet wheel engaging the wall 21.

For the purpose of rotating the ratchet wheel, I provide a pawl mechanism which comprises a piston 23 contained in a cylinder formed in the casing, said piston having a stem 24 to which is pivotally attached a pawl 25 which is adapted to engage the teeth of the ratchet wheel. The pawl, as it is operated, is adapted to be guided into engagement with the teeth of the ratchet wheel by a spring 26 secured to the bracket member.

The chamber 27 at one side of the piston 23 is connected to a chamber 28 on the non-pressure side of the brake cylinder piston 4 by a pipe 29. The pipe 29 leads into the chamber 28 at a point just beyond that to which the piston 4 travels when the brake shoes are in proper engagement with the treads of the car truck wheels.

Should the brake shoes or other parts of the brake become worn to such an extent that the travel of the piston 4 is excessive in effecting an application of the brakes, the piston will over travel the opening to the pipe 29 and fluid under pressure supplied to a chamber 30 at the pressure side of the piston 4 by way of pipe 31, will flow through pipe 29 to the piston chamber 27 and cause the piston 23 to move upwardly against the pressure of a spring 32, interposed between one side of the piston and the bracket member. The pawl 25 is moved upwardly by the piston, and is guided into engagement with a tooth of the ratchet by the spring 26 and when in such engagement rotates the ratchet wheel and shaft 16 and since the shaft is rotatable relative to the block 10 and has screw-threaded engagement therewith, the block 10, together with the attached end of the lever 12, will be caused to move in the direction toward the ratchet wheel, thus taking up the slack. The screw mechanism is preferably so proportioned that slack is compensated for at the rate of about one thirty-second of an inch for each operation of the ratchet wheel.

It will be noted that the adjusting block 10 forms a fulcrum for the lever 12 and that when the brakes are applied there will be a force acting on the block in the direction as indicated by the arrow A in Fig. 1, which is transmitted to the ratchet wheel 16 through the medium of the shaft 16, causing the outer surface of the projection 20 of the ratchet wheel to engage the surface 22 of the wall 21 of the bracket member. This force, however, is not sufficient to prevent the pawl from causing the rotation of the ratchet wheel and shaft.

Now when the brake is released, the pressure of a spring 33 contained in the chamber 28 of the brake cylinder causes the piston 4 to move to its release position, and as the piston uncovers the opening leading to the pipe 29, fluid under pressure in the piston chamber 27 flows to the atmosphere by way of pipe 29, piston chamber 28, and the clearance space between the piston stem 5 and non-pressure head 3. With the piston chamber 27 thus vented, the pressure of the spring 32 causes the piston 23 to move downwardly, carrying the pawl 25 with it out of engagement with the ratchet wheel 16.

In effecting an application of the brakes, it sometimes occurs that the piston 4 will over travel when there is no slack to be taken up. In such instances, the brake shoes will be in engagement with the car wheels before the over travel of the piston occurs, consequently, when over travel does occur, the pressure of fluid in the piston chamber 30 of the brake cylinder will be much greater than is usual when there is slack to be taken up. With this high pressure acting on the piston 4, the force transmitted to the ratchet wheel 16 through the medium of the lever 6, rod 14, lever 12, block 10, and shaft 16, will be great enough to cause the outer surface of the projection 20 of the ratchet wheel to engage the surface 22 of the wall 21 with such force that the shaft will be prevented from rotating when the pawl 25 is operated into engagement with the ratchet wheel. It will thus be seen that in such cases, where there is an over travel of the piston and no slack to be taken up, the slack adjuster will not operate to change the adjustment of the brake, thus preventing undue dragging of the shoes on the wheels.

If desired, the shaft 16 may be rotated manually for taking up slack.

I do not wish to be limited to the friction means described for preventing the operation of the slack adjuster when there is an unintentional over travel of the piston 4 and fluid under pressure is supplied to the slack adjuster, as I contemplate the use of any other means which will be subject to the force exerted by the brake cylinder piston.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a fluid pressure brake, the combination with a brake cylinder, of a slack adjuster operated by fluid under pressure supplied to said brake cylinder in applying the brakes, a support for said slack adjuster, and means subject to the pressure of fluid supplied to the brake cylinder for engaging said support for preventing the operation of said slack adjuster upon a predetermined increase in brake cylinder pressure.

2. In a fluid pressure brake, the combination with a brake cylinder, of a slack adjuster operated by fluid under pressure supplied to said brake cylinder in applying the brakes, a support for the slack adjuster, and means operative into engagement with said support to prevent said slack adjuster from operating when the pressure of fluid in the brake cylinder and supplied to the slack adjuster is increased beyond a predetermined limit.

3. In a fluid pressure brake, the combination with a brake cylinder, of a slack adjuster operated by fluid under pressure supplied to said brake cylinder in applying the brakes, a support for the slack adjuster, and means operative into engagement with said support upon an increase in brake cylinder pressure beyond a predetermined limit for preventing the operation of said slack adjuster when fluid under pressure is supplied to said slack adjuster.

4. In a fluid pressure brake, the combination with a brake cylinder, of a slack adjuster operated by fluid under pressure supplied to said brake cylinder in applying the brakes, a support for the slack adjuster, a plurality of connected brake cylinder levers subject to the pressure of fluid supplied to said brake cylinder, and means operated into engagement with said support upon the operation of said levers for preventing the operation of said slack adjuster when the pressure of fluid in said brake cylinder and supplied to said slack adjuster is increased beyond a predetermined limit.

5. In a fluid pressure brake, the combination with a brake cylinder, of a slack adjuster operated by fluid under pressure supplied to said brake cylinder in applying the brakes, a support for the slack adjuster, a brake lever connected with said slack adjuster and subject to the pressure of fluid supplied to the brake cylinder, and means included in said slack adjuster subject to the force exerted by said lever for engaging said support for controlling the operation of said slack adjuster.

6. In a fluid pressure brake, the combination with a brake cylinder, of a piston mounted in said brake cylinder, a piston stem, a brake lever connected to said stem, a bracket member projecting outwardly from said brake cylinder, a block slidably mounted in said bracket, a brake lever connected to said block, a rod connecting said levers, a shaft mounted in said bracket member and having screw-threaded connection with said block, a ratchet wheel for rotating said shaft, a pawl for operating said ratchet wheel, means subject to the pressure of fluid supplied from the brake cylinder for operating said pawl, and means subject to the force exerted on said block by the second mentioned lever in applying the brakes for controlling the rotation of said ratchet wheel and shaft.

7. In a fluid pressure brake, the combination with a brake cylinder, of a piston mounted in said brake cylinder, a piston stem, a brake lever connected to said stem, a bracket member projecting outwardly from said brake cylinder, a block slidably mounted in said bracket, a brake lever connected to said block, a rod connecting said levers, a shaft mounted in said bracket member and having screw-threaded connection with said block, a ratchet wheel for rotating said shaft, a pawl for operating said ratchet wheel, means on said ratchet wheel adapted to be moved into frictional engagement with said bracket member by the force exerted on said block by the first mentioned lever in applying the brakes, the frictional resistance between said means and bracket member being proportionate to the pressure of fluid in said brake cylinder.

8. The combination with a brake cylinder and a fluid pressure operated slack adjuster operated by fluid supplied from said brake cylinder upon a predetermined travel of the brake cylinder piston in applying the brakes to take up slack, of means operative to prevent the operation of said slack adjuster when fluid under pressure is supplied to said slack adjuster after the brake is applied.

9. The combination with a brake cylinder and a fluid pressure operated slack adjuster operated by fluid supplied from said brake cylinder upon a predetermined travel of the brake cylinder piston in applying the brakes to take up slack, of means operative to prevent the operation of said slack adjuster when fluid under pressure is supplied to said slack adjuster and there is no slack in the brake to be taken up.

10. The combination with a brake cylinder and a fluid pressure operated slack adjuster operated by fluid supplied from said brake cylinder upon a predetermined travel of the brake cylinder piston in applying the brakes to take up slack, of a plurality of connected cylinder brake levers operated by said piston to apply the brakes, and means operative upon the operation of said levers for rendering said slack adjuster inoperative when there is no slack to be taken up and fluid under pressure is supplied to said slack adjuster.

11. In a fluid pressure brake, the combination with a brake cylinder, of a piston mounted in said brake cylinder operative by fluid under pressure to a predetermined position to apply the brakes, a slack adjuster operated by fluid under pressure supplied from the brake cylinder when said piston is operated beyond said predetermined position and there is slack in the brake to be taken up, and means operative to prevent the operation of the slack adjuster to take up slack when said piston is operated beyond said predetermined position and there is no slack in the brake to be taken up.

12. In a fluid pressure brake, the combination with a brake cylinder, of a piston mounted in said brake cylinder operative by fluid under pressure to a predetermined position to apply the brakes, a slack adjuster operated by fluid under pressure supplied from the brake cylinder when said piston is operated beyond said predetermined position and the pressure of fluid in the brake cylinder is not higher than that required to normally apply the brakes, and means operative to prevent the operation of the slack adjuster to take up slack when said piston is operated beyond said predetermined position and the pressure of fluid in the brake cylinder is higher than that required to normally apply the brakes.

13. In a fluid pressure brake, the combination with a brake cylinder, of a piston mounted in said brake cylinder operative by fluid under pressure to a predetermined position to apply the brakes, a slack adjuster operated by fluid under pressure supplied from the brake cylinder when said piston is operated beyond said predetermined position and the pressure of fluid in the brake cylinder is not higher than that required to normally apply the brakes, and means included in the slack adjuster and operative upon the operation of the piston to apply the brakes to prevent the operation of the slack adjuster to take up slack when the piston is operated beyond said predetermined position and the pressure of fluid in the brake cylinder is higher than that required to normally apply the brakes.

In testimony whereof I have hereunto set my hand, this 13th day of August, 1928.

MILTON L. HANCOCK.